United States Patent [19]
Walker et al.

[11] 3,878,290
[45] Apr. 15, 1975

[54] DIVALENT METAL SALTS OF DODECARHODIUM-TRIACONTA CARBONYLS

[75] Inventors: Wellington E. Walker, Charleston; Earle S. Brown, South Charleston; Roy L. Pruett, Charleston, all of Va.

[73] Assignee: Union Carbide Corporation, New York, N.Y.

[22] Filed: June 19, 1973

[21] Appl. No.: 371,354

[52] U.S. Cl. ................. 423/249; 423/263; 423/417
[51] Int. Cl. ..... C01f 13/00; C01g 55/00; C01g 1/04
[58] Field of Search ............ 423/249, 417, 418, 263

[56] References Cited
OTHER PUBLICATIONS

Chini et al., "Synthesis of Rhodium Carbonyl Compounds at Atmospheric Pressure," Chemical Abstracts, Volume 71, 1969, page 510 (56181t).
Albano et al., "Metal Atom Clusters in Polynuclean Carbonyl Compounds of Cobalt and Rhodium," Chemical Abstracts, Vol. 71, 1969, pages 436 and 437 (129671a).
Albano et al., "Novel Metal Cluster in the Tetramethylammonium Salt of the Doetahedral Tricontacarbonyl Dodecarhodate Dianian [$Rh_{12}(CO)_{30}$]$^2$," Chemical Abstracts Vol. 71, 1969, p. 376 (117395g).

Primary Examiner—Earl C. Thomas
Attorney, Agent, or Firm—Michael L. Hendershot

[57] ABSTRACT

This invention relates to novel rhodium carbonyl salts of metals having the formula

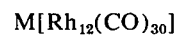

$$M[Rh_{12}(CO)_{30}]$$

wherein M is a select class of divalent metal cations. These compounds are useful catalysts in the reaction between carbon monoxide and hydrogen to produce oxygenated compounds such as methanol, ethylene glycol, glycerine and 1,2-propylene glycol as described in application Ser. No. 371,350, filed on even date herewith.

21 Claims, No Drawings

DIVALENT METAL SALTS OF DODECARHODIUM-TRIACONTA CARBONYLS

This invention is concerned with the formation of new rhodium carbonyl salts which are useful catalysts in the synthesis of reaction products of carbon monoxide and hydrogen.

The new rhodium carbonyl salts of this invention are characterized by the formula:

$$M[Rh_{12}(CO)_{30}]$$

wherein M is a divalent metal cation selected from the group consisting of beryllium, magnesium, calcium, strontium, radium, scandium, yttrium, manganese, iron, ruthenium, rhenium, cobalt, nickel, palladium, platinum, zinc, cadmium, mercury, cerium and europium.

The salts of this invention are believed to comprise a rhodium carbonylcluster having the following structure:

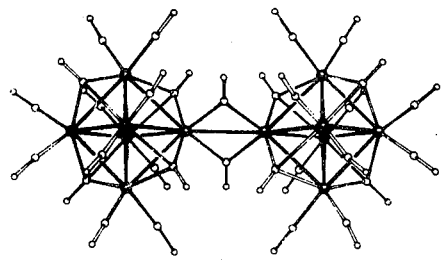

This structure is believed to be readily ascertainable by infrared analysis which shows four significant wave length bands in the metal carbonyl region in its infrared spectra at about 2070 cm$^{-1}$, about 2045 cm$^{-1}$, about 2008 cm$^{-1}$ and about 1773 cm$^{-1}$. Each of these bands may vary by ± 15 cm$^{-1}$.

The compositions of this invention can be prepared by the following enumerated processes:

1. These compositions may be prepared by contacting in an inert atmosphere tetrarhodium dodecacarbonyl with an excess of a soluble metal carboxylate of the desired metal cation in an appropriate solvent containing water in amounts up to 20% by weight of the solvent.

2. Alternatively, these compositions may be prepared by contacting under an atmosphere of carbon monoxide a monovalent rhodium carbonyl cation complex with a soluble metal carboxylate in a suitable solvent containing water in amounts up to 20% by weight of the solvent.

3. These compositions can also be prepared via a double decomposition of an appropriate metal salt of dodecarhodium triacontacarbonyl anion, in which the metal cation is different from the desired metal cation, by contacting said salt with a salt of the desired metal, carrying out the double decomposition in an appropriate solvent under an inert atmosphere.

It is believed that the above processes are achieving part or all of the reactions in the sequence depicted below:

a. $4 Rh(CO)_2L_2 + 4CO \rightarrow Rh_4(CO)_{12}$
b. $Rh_4(CO)_{12} + H_2O \rightarrow [Rh_4(CO)_{11}(COOH)]^-$
c. $[Rh_4(CO)_{11}(COOH)]^- \rightarrow [Rh_4(CO)_{11}H]^- + CO_2$
d. $[Rh_4(CO)_{11}H]^- \xrightarrow{B:} [Rh_4(CO)_{11}]^{2-} + BH+$
e. $[Rh_4(CO)_{11}]^{2-} + Rh_4(CO)_{12} \rightarrow [Rh_8(CO)_{22}]^{2-}$
f. $[Rh_8(CO)_{22}]^{2-} + Rh_4(CO)_{12} \rightarrow [Rh_{12}(CO)_{34}]^{2-}$
g. $[Rh_{12}(CO)_{34}]^{2-} [Rh_{12}(CO)_{30}]^{2-} \rightleftharpoons + 4 CO$ For example, in the case of the first enumerated process, the first step of the process is believed to be that depicted as b followed by reactions c through g. In the case of the second enumerated process, the first step is believed to be that depicted as a followed by reactions b through g. In the case of the third enumerated process, the reaction is between only the metal salt and $[Rh_{12}(CO)_{30}]^{2-}$.

In reaction a above, "L" can be the anions of strong mineral acids (Cl$^-$, SO$_4^{-2}$, PO$_3^{-3}$, and the like), carboxylates, and organic ligands such as compounds which contain at least one nitrogen atom (hereinafter called Lewis base nitrogen atom) and/or at least one oxygen atom (hereafter called Lewis base oxygen atoms), said atoms possessing a pair of electrons available for the formation of coordinate bonds with rhodium. Desirably, the organic ligand contains at least two Lewis base nitrogen atoms, or at least two Lewis base oxygen atoms, or at least one Lewis nitrogen atom plus at least one Lewis base oxygen atom, said atoms possessing a pair of electrons available for the formation of coordinate bonds with rhodium, and said organic ligand forming with rhodium per se a chelate structure. In suitable embodiments the organic ligands contain from 2 and upwards to 4 Lewis base atoms, preferably from 2 to 3 such atoms, and most preferably 2 Lewis base atoms. These organic ligands are said to be multidentate or polydentate, that is to say, such ligands are bidentate, tridentate, or quadridentate, depending on whether 2, 3 or 4 Lewis base atoms are involved in the formation of chelate structures with rhodium.

Organic ligands which contain at least one Lewis base nitrogen atom will oftentimes hereinafter be referred to as "organic nitrogen ligands"; those ligands which contain at least one Lewis base oxygen atom will often times be referred to as "organic oxygen ligands"; and those which contain at least one Lewis base nitrogen atoms plus at least one Lewis base oxygen atom will oftentimes be referred to as "organic aza-oxa ligands".

Suitable organic nitrogen ligands most generally contain carbon, hydrogen, and nitrogen atoms. Suitable organic oxygen ligands most generally contain carbon, hydrogen, and oxygen atoms. Suitable organic aza-oxa ligands most generally contain carbon, hydrogen, oxygen, and nitrogen atoms. The carbon atoms can be acyclic and/or cyclic such as aliphatic, cycloaliphatic, aromatic (including fused and bridged) carbon atoms, and the like. Preferably, the organic ligands contain from 2 to 20 carbon atoms. The nitrogen atoms can be in the form of imino (—N=), amino

nitrilo (N ≡ ), etc. Desirably, the Lewis base nitrogen atoms are in the form of imino nitrogen and/or amino nitrogen. The oxygen atoms can be in the form of groups such as hydroxyl (aliphatic or phenolic), carboxyl

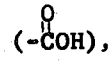

carbonyloxy

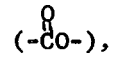

oxy (—O—), carbonyl

etc. all of said groups containing Lewis base oxygen atoms.

In this respect, it is the "hydroxyl" oxygen in the

group and the "oxy" oxygen in the

groups that are the Lewis base atoms. The organic ligands may also contain other atoms and/or groups such as alkyl, cycloalkyl, aryl, chloro, thiaalkyl, trialkylsilyl, and the like.

Illustrative organic nitrogen ligands include for instance, N,N,N',N'-tetramethylethylenediamine, N,N,N', N'-tetraethylethylenediamine, N,N,N'N'-tetra-n-propylethylenediamine, N,N,N'N'-tetramethylmethylenediamine, N,N,N',N'-tetraethylmethylenediamine,N,N,N'N'-tetraisobutylmethylenediamine, piperazine, N-methylpiperazine, N-ethylpiperazine, 2-methyl-N-methylpiperazine, 2,2'-dipyridyl, methyl-substituted 2,2'-dipyridyl, ethyl-substituted 2,2'dipyridyl, 1,4-diazabicyclo[2.2.2]octane, methyl-substituted 1,4-diazabicyclo[2.2.2]octane, purine, 2-aminopyridine, 2-(dimethylamino)pyridine, 1,10-phenanthroline, methyl-substituted 1, 10-phenanthroline, 2-(dimethylamino)-6-methoxy-quinoline, 7-chloro-1,10-phenanthroline, 4-triethylsilyl-2,2'-dipyridyl, 5-(thiapentyl)-1,10-phenanthroline, and the like.

Illustrative organic oxygen ligands include, by way of illustrations, glycolic acid, methoxyacetic acid, ethoxyacetic acid, diglycolic acid, thiodiglycolic acid, diethyl ether, tetrahydrofuran, dioxane, tetrahydropyran, pyrocatechol, citric acid, 2-methoxyethanol, 2-ethoxyethanol, 2-n-propoxyethanol, 2-n-butylethanol, 1,2,3-trihydroxybenzene, 1,2,4-trihydroxybenzene, 2,3-dihydroxynaphthaline, cyclohexane-1,2-diol, oxetane, 1,2-dimethoxybenzene, 1,2-diethoxybenzene, methyl acetate, ethanol, 1,2-dimethoxyethane, 1,2-diethoxyethane, 1,2-di-n-propoxyethane, 1,2-di-n-butoxyethane, pentane-2,4-dione, hexane-2,4-dione, heptane-3,5-dione, octane,-2,4-dione, 1-phenylbutane-1,3-dione, 3-methylpentane-2,4-dione; the mono- and dialkyl ethers of propylene glycol, of diethylene glycol, of dipropylene glycol; and the like.

Illustrative organic aza-oxa ligands include, for example, ethanolamine, diethanolamine, isopropanolamine, di-n-propanolamine, N,N-dimethylglycine, N,N-diethylglycine, iminodiacetic acid, N-methyliminodiacetic acid, N-methyldiethanolamine, 2-hydroxypyridine, methyl-substituted 2-hydroxypyridine, picolinic acid, methyl-substituted picolinic acid, nitrilotriacetic acid, 2,5-dicarboxypiperazine, N-(2-hydroxyethyl)iminodiacetic acid, ethylenediaminetetraacetic acid, 2,6-dicarboxypyridine, 8-hydroxyquinoline, 2-carboxyquinoline, cyclohexane 1,2-diamine-N,N,N',N'-tetraacetic acid, the tetramethyl ester of ethylenediaminetetraacetic acid, and the like, Other organic compounds which form ionic association with rhodium carbonyl compounds are useful ligands. They are organic compounds which possess Lewis base nitrogen atoms and typically are composed of carbon, hydrogen and nitrogen. Illustrative of such compounds are, e.g., piperidine, 2-methylpiperidine, 3-methylpiperidine, pyridine, 2-methylpyridine, 4-ethylpiperidine, dibutylamine, methylamine, dodecylamine, morpholine, aniline, benzylamine, octadecylamine, naphthylamine, cyclohexylamine, and the like.

The enumerated processes can be operated at temperatures ranging from about 0°C to about 375°C, and preferably at ambient room temperature (about 20°–28°C.) up to about 100°C. The pressures employed are dependent upon the amount of carbon monoxide required to complete product formation. In the case of the first enumerated process, carbon monoxide pressure is not required, therefore the process can be carried out at atmospheric pressure or under superatmospheric pressure. The second enumerated process requires carbon monoxide pressure since reaction a requires CO addition.

The residence time of the reactions can be followed by taking periodic infrared spectra of samples of the reaction.

The reaction time varies with the process chosen, the pressures employed, the temperatures used, and the like considerations.

The inert atmosphere is any gaseous material which does not interfere with the reaction(s), and, e.g., includes nitrogen, argon, helium krypton, neon, and the like.

In the practice of these processes, the solvents employable include, by way of example, saturated and aromatic hydrocarbons e.g., hexane, octane, dodecane, naphtha, decalin, tetrahydronaphthalene, kerosens, mineral oil, cyclohexane, cycloheptane, alkylcycloalkane, benzene, toluene, xylene, naphthalene, alkylnaphthalene, etc.; ethers such as tetrahydrofuran, tetrahydropyran, diethyl ether, 1,2-dimethoxybenzene, 1,2-ethoxybenzene, the mono- and dialkyl ethers of ethylene glycol, of propylene glycol, of butylene glycol, of diethylene glycol, of dipropylene glycol, of dibutylene glycol, of triethyleneglycol, of tetraethylene glycol, of oxyethyleneoxypropylene glycol, etc.; alkanols such as methanol, ethanol, propanol, isobutanol, 2-ethylhexanol, etc.; ketones such as acetone, methyl ethyl ketone, cyclohexanone, cyclopentanone, etc.; esters such as methyl acetate, ethyl acetate, propyl acetate, butyl acetate, methyl propionate, ethyl butyrate, methyl laurate, etc.; water; anhydrides such as phthalic anhydride, acetic anhydride, etc.; and others. Tetrahydrofuran, and the mono- and dialkylethers of triethylene and tetraethylene glycol are preferred diluents.

The following procedures represent the best modes available for producing the salt products of this invention as depicted in the table below:

Procedure A

Tetrarhodium dodecacarbonyl (0.13 mol) is charged to a glass vessel equipped with a magnetic stirrer bar along with the divalent metal carboxylate (2.5 mol) and an appropriate solvent such as tetrahydrofuran containing water in an amount up to 20% by weight of the solvent. These reagents are stirred under an inert atmosphere. The reaction is followed by periodic determination of the infrared spectrum of the mixture.

Procedure B:

| Divalent metal salt | Reaction time, Hours | Procedure Employed | Salt Product |
| --- | --- | --- | --- |
| Mg(OOCCH$_3$)$_2$ | 24 | B | Mg[Rh$_{12}$(CO)$_{30}$] |
| Mg(OOCCH$_3$)$_2$ | 18 | B | Mg[Rh$_{12}$(CO)$_{30}$] |
| Ca(OOCCH$_3$)$_2$ | 24 | B | Ca[Rh$_{12}$(CO)$_{30}$] |
| Be(OOCCH$_3$)$_2$ | 24 | B | Be[Rh$_{12}$(CO)$_{30}$] |
| Sr(OOCCH$_3$)$_2$ | 24 | B | Sr[Rh$_{12}$(CO)$_{30}$] |
| Mg(OOCCH$_3$)$_2$·4H$_2$O | 5 | A | Mg[Rh$_{12}$(CO)$_{30}$] |
| Mg(OOCCH$_3$)$_2$·4H$_2$O | 1 | C | Mg[Rh$_{12}$(CO)$_{30}$] |
| RaCl$_2$ | 1 | C | Ra[Rh$_{12}$(CO)$_{30}$] |
| Mn(OOCCH$_3$)$_2$·4H$_2$O | 2 | C | Mn[Rh$_{12}$(CO)$_{30}$] |
| FeCl$_2$ | 1 | C | Fe[Rh$_{12}$(CO)$_{30}$] |
| Co(OOCCH$_3$)$_2$·4H$_2$O | 16 | B | Co[Rh$_{12}$(CO)$_{30}$] |
| EuCl$_2$ | 2 | C | Eu[Rh$_{12}$(CO)$_{30}$] |
| CdC$_2$O$_4$ | 1.5 | C | Cd[Rh$_{12}$(CO)$_{30}$] |
| Zn(OOCCH$_3$)$_2$·2H$_2$O | 16 | A | Zn[Rh$_{12}$(CO)$_{30}$] |
| Ce(OOCCH$_3$)$_2$·1.5H$_2$O | 8 | B | Ce[Rh$_{12}$(CO)$_{30}$] |
| NiCl$_2$·6H$_2$O | 2 | C | Ni[Rh$_{12}$(CO)$_{30}$] |
| Pd(OOCCH$_3$)$_2$ | 24 | A | Pd[Rh$_{12}$(CO)$_{30}$] |
| Pt(OOCCH$_3$)$_2$ | 10 | B | Pt[Rh$_{12}$(CO)$_{30}$] |
| HgCl$_2$ | 1 | C | Hg[Rh$_{12}$(CO)$_{30}$] |

To a clean, dry saponification kettle containing a magnetic stirrer bar, is added under a nitrogen purge bis(carbonyl) (acetylacetonato)rhodium (I) (2.74 g, 0.0105 mol.), the divalent metal carboxylate (0.05 mol.), and tetrahydrofuran which is freshly distilled from lithium aluminum hydride (80 ml.). The bottle is sealed employing a neoprene septum and perforated bottle cap. To the mixture is then added 0.4 ml. of distilled water via syringe. The bottle is then purged thoroughly with carbon monoxide and 26 psig CO is applied to the bottle via a syringe needle coupled to a pressure bottle of CO. The contents are stirred at room temperature for the periods of time specified below. The pressure bottle is depressurized and placed in a glove box under N$_2$. The reactor contents, deep violet in color, are discharged and are filtered to remove excess divalent metal carboxylate. The resulting solution is concentrated by evaporation of tetrahydrofuran. Deep violet crystals of M[Rh$_{12}$(CO)$_{30}$] are then recovered. Its infrared spectrum both as a mull and in solution in tetrahydrofuran is consistent with the presence of the cluster anion Rh$_{12}$(CO)$_{30}^{2-}$.

Procedure C

In an inert atmosphere the sodium salt of dodecarhodium triacontacarbonyl anion, Na$_2$[Rh$_{12}$(CO)$_{30}$](1.06 g., 0.0005 mol) is dissolved in distilled water (70 ml.). To this solution is added divalent metal salt (0.0015 mol). The insoluble divalent metal salt of dodecarbodium triacontacarbonyl anion is recovered by filtration under an inert atmosphere.

What is claimed is:

1. Rhodium carbonyl salts of the formula $$M[Rh_{12}(CO)_{30}]$$

wherein M is a divalent metal cation selected from the group consisting of beryllium, magnesium, calcium, strontium, radium, scandium, yttrium, manganese, iron, ruthenium, rhenium, cobalt, nickel, palladium, platinum, zinc, cadmium, mercury, cerium, and europium.

2. The salt of claim 1 wherein M is beryllium.
3. The salt of claim 1 wherein M is magnesium.
4. The salt of claim 1 wherein M is calcium.
5. The salt of claim 1 wherein M is strontium.
6. The salt of claim 1 wherein M is radium.
7. The salt of claim 1 wherein M is scandium.
8. The salt of claim 1 wherein M is yttrium.
9. The salt of claim 1 wherein M is manganese.
10. The salt of claim 1 wherein M is iron.
11. The salt of claim 1 wherein M is ruthenium.
12. The salt of claim 1 wherein M is rhenium.
13. The salt of claim 1 wherein M is cobalt.
14. The salt of claim 1 wherein M is nickel.
15. The salt of claim 1 wherein M is palladium.
16. The salt of claim 1 wherein M is platinum.
17. The salt of claim 1 wherein M is zinc.
18. The salt of claim 1 wherein M is cadmium.
19. The salt of claim 1 wherein M is mercury.
20. The salt of claim 1 wherein M is cerium.
21. The salt of claim 1 wherein M is europium.

* * * * *

UNITED STATES PATENT OFFICE
CERTIFICATE OF CORRECTION

Patent No. 3,878,290            Dated  April 15, 1975

Inventor(s) W. E. Walker, E. S. Brown and R. L. Pruett

It is certified that error appears in the above-identified patent and that said Letters Patent are hereby corrected as shown below:

Column 2, line 3; page 4, line 10 of application:

"g. $[RH_{12}(CO)_{34}]^{2-}[Rh_{12}(CO)_{30}]^{2-} \rightleftharpoons +4CO$" should read, --g. $[Rh_{12}(CO)_{34}]^{2-} \rightleftharpoons [Rh_{12}(CO)_{30}]^{2-} +4CO$--.

Column 2, line 13; page 5, line 2 of application:
After "$PO_3^{-3}$" insert --$NO_3^-$--.

Column 2, line 39; page 6, line 5 of application:
"often times" should read --oftentimes--.

Column 4, line 35; page 10, line 11 of application:
"kerosens" should read --kerosene--.

Signed and Sealed this thirteenth Day of April 1976

[SEAL]

Attest:

RUTH C. MASON
*Attesting Officer*

C. MARSHALL DANN
*Commissioner of Patents and Trademarks*